May 25, 1965  O. J. B. ORWIN  3,185,275
OVERLOAD CLUTCH OR TORQUE LIMITING DEVICE
Filed June 25, 1963  3 Sheets-Sheet 1

INVENTOR.
OLAF JOHN BARCLAY ORWIN

May 25, 1965     O. J. B. ORWIN     3,185,275
OVERLOAD CLUTCH OR TORQUE LIMITING DEVICE
Filed June 25, 1963     3 Sheets-Sheet 2

INVENTOR.
Olaf John Barclay Orwin
By Kurt Kelman
agent

May 25, 1965  O. J. B. ORWIN  3,185,275
OVERLOAD CLUTCH OR TORQUE LIMITING DEVICE
Filed June 25, 1963  3 Sheets-Sheet 3
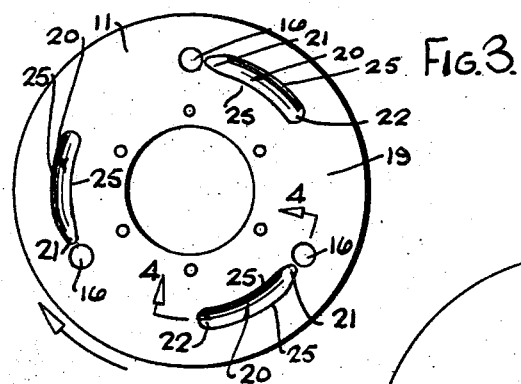
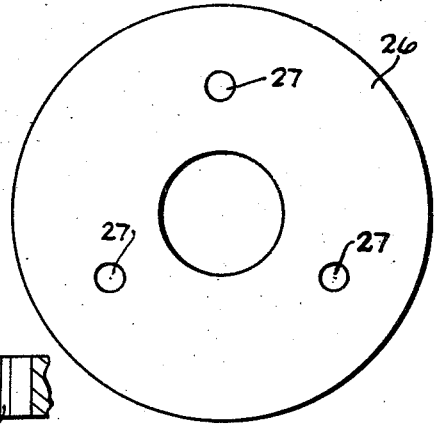
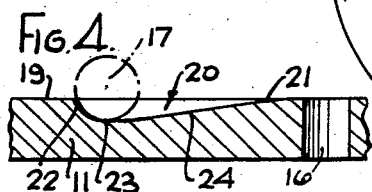
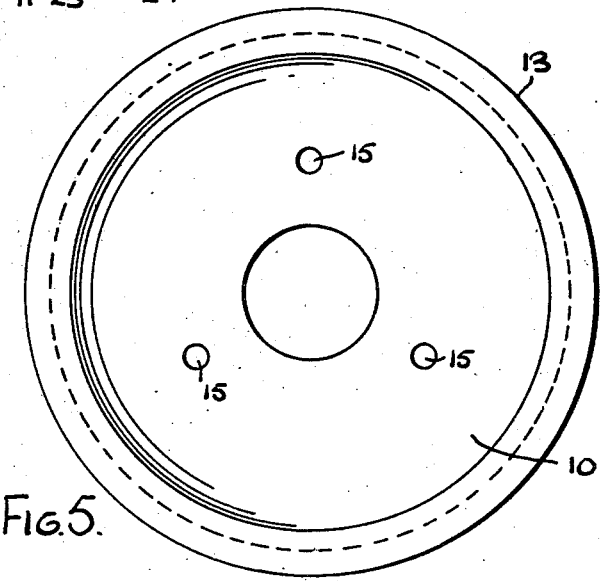
INVENTOR
OLAF JOHN BARCLAY ORWIN
By Kent Kelman
agent 3,185,275
OVERLOAD CLUTCH OR TORQUE LIMITING
DEVICE
Olaf John Barclay Orwin, Birmingham, England, assignor to Fisher & Ludlow Limited, Tipton, England, a British company
Filed June 25, 1963, Ser. No. 290,542
Claims priority, application Great Britain, June 30, 1962, 25,180/62
2 Claims. (Cl. 192—56)

This invention relates to torque limiting devices or overload clutches herein referred to under the generic expression "overload clutch" of the kind herein referred to as the kind specified, comprising driving and driven clutch members, each having a plurality of ball positioning openings, a plurality of torque transmitting balls, the arrangement being such that when the clutch is transmitting torque, each ball is positioned partially within a driving and driven clutch member ball positioning opening, so as thereby to prevent relative rotation between the two clutch members, the two clutch members being mounted for relative axial displacement away from one another against spring or other loading, so as to permit of the balls disengaging from the ball positioning openings of at least one of the two clutch members and of the latter rotating relatively on more than a predetermined torque being applied to the driving clutch member.

One form of overload clutch of the foregoing kind is the subject of U.S. Patent No. 3,095,955.

Such particular clutch was specifically designed for transmitting relatively low torques, e.g. of the order of 100/500 inch lbs. but is not suitable for transmitting heavy torques of the order of 1000/5000 inch lbs. This is because with the particular construction described in the prior specification when the clutch is in the disengaged position the balls continue to have sliding engagement with at least one of the two clutch members with which they are still in pressure contact under the spring or other loading, and under the higher contact pressure arising from a high spring or other loading necessary for the transmission of very substantial torques, the balls and the clutch member surfaces with which they engage would wear away very rapidly under the relative rotation between the two clutch members as soon as the clutch commences to disengage under a torque in excess of the designed maximum torque.

The present invention has for its object the provision of an alternative construction which is specifically adapted to take care of the transmission of very heavy torques without the aforementioned undesirable wear occurring.

According to the present invention we provide an overload clutch of the kind specified, which is characterised in that one of the two clutch members is provided with a plurality of ball receiving openings of elongated configuration each adapted when the clutch is in the disengaged position to receive one of the balls from an adjacent ball positioning opening in such member, each ball receiving opening having an axial depth in a direction parallel to the clutch axis sufficiently great as when a ball is received therein to permit of the two clutch members rotating relatively without any sliding engagement between either of them and the balls, the clutch member provided with the ball receiving openings having its ball engaging face devoid of projections at positions between each ball positioning opening of such member and the corresponding ball receiving opening, the arrangement being such that the balls can enter and leave the ball positioning openings in such clutch member without it being necessary for the clutch members to move relatively apart against the spring or other loading by a distance substantially greater than a diameter of one of the balls.

Insofar as with the present invention the two clutch members are not required to move relatively apart by a distance greater than the amount referred to during the disengagement or re-engagement of the clutch, the spring or other loading can be made of a very stiff, i.e. of a relatively unyielding nature as is requisite for the transmission of the very high torques which the clutch of the present invention is specifically designed to transmit.

Also, insofar as the balls are not required to ride over any projections as they leave or enter the aforementioned ball positioning openings, any wear of the balls consequent of such riding over movement is avoided.

It is a further essential feature of the present invention that the clutch member having the ball receiving openings of elongated form is also provided with ball positioning openings additional to the ball receiving openings, which ball positioning openings are specifically designed, i.e. shaped, so as to transmit the required high torque through the balls from the driving to the driven member of the clutch when the clutch is engaged, i.e. the ball receiving openings are not required to transmit torque when the clutch is engaged. Thus each of these two forms of opening can be specifically designed so as to perform their respective functions in the most efficient manner possible.

Nevertheless each ball receiving opening may merge into the mouth of a corresponding ball positioning opening in the associated clutch member.

Preferably each elongated ball receiving opening is formed as a shallow recess of arcuate, e.g. circular configuration in cross section having a maximum width as measured at the outer face of the associated clutch member somewhat greater than the ball diameter.

Preferably the base portion of each of these elongated ball receiving openings is of tapered form so that each ball receiving opening, is of maximum depth at a position intermediate its two ends, such an arrangement permitting of the balls entering and leaving the ball receiving openings with the minimum of impact.

The invention is illustrated in the accompanying drawings wherein:

FIGURE 3 is an end view looking in the direction of the arrow 3 in FIGURE 1 depicting in end elevation the driven member of the clutch.

FIGURE 4 is a sectional view to an enlarged scale on the line 4—4 of FIGURE 3.

FIGURE 5 is an end view looking in the direction of the arrow 5 in FIGURE 1 depicting in end elevation the driving member of the clutch.

FIGURE 6 is a view in end elevation of the ball locating member of the clutch.

Figure 1:
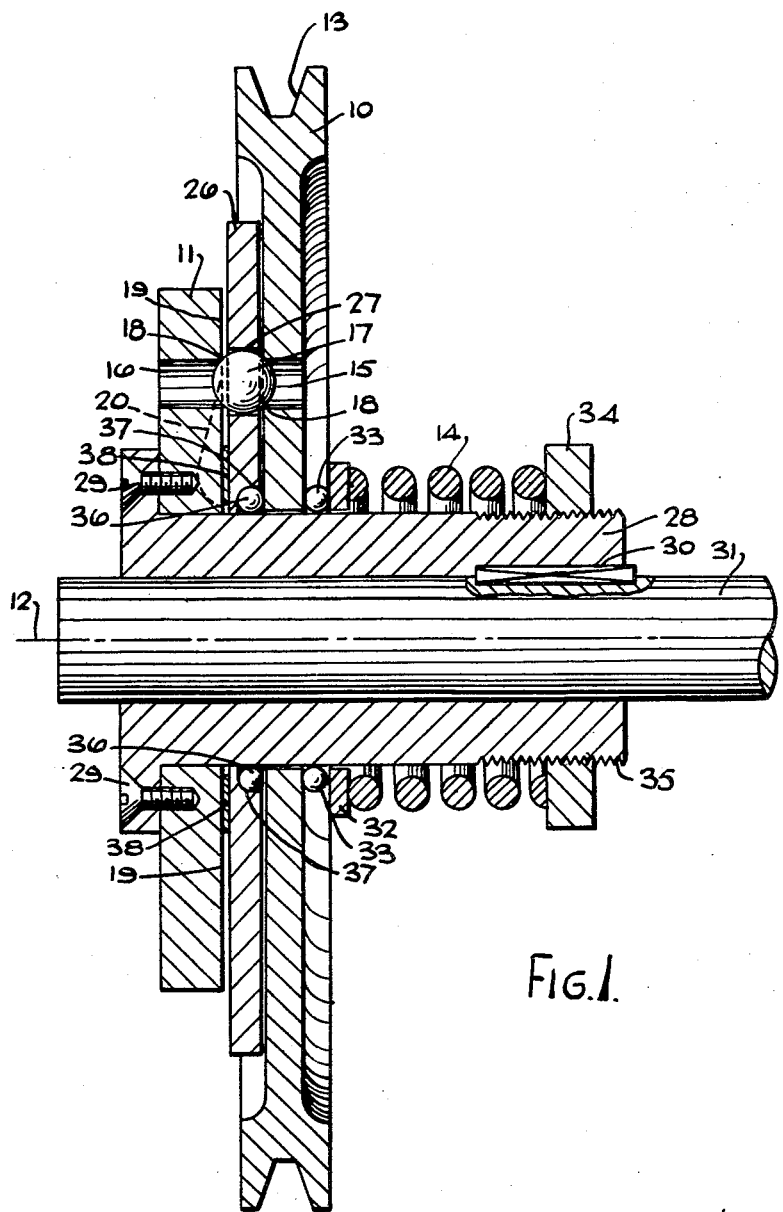
FIGURE 1 is a side elevation depicting in cross section one form of overload clutch in accordance with the present invention, the parts being depicted with the clutch in the engaged or torque transmitting position.

Referring to the drawings, the overload clutch there depicted is specifically adapted for use in printing, e.g. newspaper printing machinery in which the driving torque is particularly high, e.g. of the value above indicated.

Such overload clutch comprises driving and driven clutch members 10, 11, each of disc-like configuration mounted for rotation about a common axis 12 with the two members spaced co-axially apart, the driving member 10 being in the known manner formed with a grooved rim 13 for receiving a belt from a power source not shown.

The driving member 10 of the clutch is axially slidable away from the driven member against heavy spring loading 14.

Both the driving and the driven members 10, 11 are formed with a number, preferably as shown three, symmetrically spaced ball engaging openings 15, 16 respectively, and each in the form of a through axially extending hole, the holes 15, 16 being all of the same diameter and spaced by the same radial distance from the clutch axis 12 so that in one relative position of the two clutch members 10, 11 the holes 15 of the driving member are each precisely in register with a corresponding hole 16 in the driven member 11 and in this position, namely the driving position depicted in FIGURE 1, the aligned holes 15, 16 are adapted to receive opposite sides of one of three torque transmitting balls 17 each of a diameter somewhat larger than the diameter of the ball engaging holes 15, 16.

For example, in one arrangement the holes 15, 16 may have a diameter of $11/16''$ and the balls 17 may have a diameter of $1''$, i.e. a radius of $.50''$, the balls being then in the known manner in pressure engagement with the edges 18 of the aligned holes 15, 16 so as to transmit the torque from the driving member 10 to the driven member 11.

That face 19 of the driving member 10 which is directed towards the driving member 10 is formed with three similar ball receiving grooves 20 each in the form of a recess of elongated, i.e. part circular configuration having its central longitudinal axis formed by part of a circle common to each of the three recesses 20.

As shown in FIGURE 3, each recess 20 extends in the designed direction of rotation denoted by the arrow in FIGURE 3, from a position adjacent the forward side (in the designed rotation direction) of one of the holes 16, so that one end 21 of each recess 20 and which constitutes a ball entering end is adjacent one of the holes 16.

As shown in FIGURES 3 and 4 the ball entering end 21 of each recess 20 is of tapered configuration in such a manner that the width and also the depth of each recess increases progressively in a direction along the length of the elongated recess away from the ball entering end 21 so that at a position near the opposite end 22 of each recess, the latter as best shown in FIGURE 4 is of maximum depth in addition to being of maximum width.

This portion of each recess 20 which is of maximum depth as well as of maximum width constitutes a ball receiving portion 23 and is adapted to accommodate a corresponding ball 17 as indicated in outline in FIGURE 4 when the clutch is in the disengaged position.

Such ball receiving portion 23 has a width as measured at the mouth of the recess which is slightly greater than the ball diameter, e.g. for a ball diameter of $1''$ the width of the recess at this position may be of the order of $1.03''$. The ball receiving portion 23 with the aforementioned ball diameter may have an overall depth of the order of .30 to $.32''$, while the angle of taper of the base portion 24 of the recess in a direction from the ball entering end 21 may be of the order of 7°.

Each ball receiving recess is of concavedly curved configuration in cross section, and the cross section being such that the side of the concavedly curved recess at all positions along the length thereof are out of contact with the ball when disposed equidistantly between the longitudinal edges 25 of each recess 20.

The arrangement is such that when the balls 17 are within any part of these recesses 20 there is no danger of them becoming jammed between the side edges 25 of the recesses, the balls being adapted to roll along the bases 24 of the recesses without necessarily engaging with the sides thereof.

The ball receiving portion 22 of each recess further has a depth which is slightly more than twice the distance by which each ball is adapted to project within each of the ball engaging holes 15 when the clutch is engaged.

Provision is made for preventing the two members 10, 11 of the clutch moving towards one another under the spring loading by a distance appreciably beyond the position which they occupy when the clutch is in the engaged position. Thus, when a ball 17 is received within the centre portion of each recess in the driving member it is not only out of pressure engagement with, but is in fact completely out of engagement with the adjacent opposed face of the driven member 11.

Such provision comprises a ball guiding cage 26 disposed between the opposed faces of the two clutch members 10, 11, such ball guiding cage 26 having a plurality, namely three, bores 27 spaced equally distantly apart in manner corresponding to the spacing of the ball engaging holes 15, 16 and the ball guiding cage 26 serves to locate the balls 17 at the same relative circumferential distance when the clutch is both engaged and disengaged.

The cage 26 is formed as a disc of axial thickness substantially less than the distance between the opposed faces of the clutch members 10, 11, and preferably is adapted to engage frictionally with the driven member 11 so that when as hereinafter described, the balls 17 disengage from the driving member positioning holes 15, the cage 26 is not subjected to any rotational movement and is retained in a position in which its locating holes 27 are out of register with the ball engaging holes 16 in the driven member; the arrangement avoiding any undesirable impact between the balls 17 and the driven member holes 16 when the clutch is in the disengaged position.

The driven member 11 of the clutch is in the known manner mounted upon a driven sleeve or hub 28 to which it is connected by set screws 29 and this driven sleeve 28 is keyed at 30 to driven shaft 31 from which the drive is taken to the mechanism to be driven.

The aforementioned spring 14 is mounted on the exterior of the sleeve 28 and with one end of the spring engaging the adjacent face of the driving member 10 through thrust ring 32 between which and the driving member are disposed thrust balls 33.

The opposite end of the spring 14 engages with a thrust nut 34 which is in threaded engagement with the adjacent screw threaded exterior 35 of the sleeve and by turning the nut 34 it will be understood that the loading of spring 14 can be varied and adjustment can therefore be obtained in the torque at which the clutch disengages.

A second series of thrust balls 36 is provided between the driving member 10 and the driven member 11 these being accommodated within a recess 37 in the central bore of the cage 26. The provision of these two rings of balls 33, 36 facilitates the aforementioned over-running movement of the driving member 10 while when the clutch is fully disengaged as shown in FIGURE 2 the loading of spring 14 is taken through two sets of balls 36, 37 and through a thrust washer 38 between the cage 26 and the driven member 11 and is thus transmitted to the driven member 11 and hence to the sleeve 28 without the balls 17 themselves being loaded in any way as will be clearly apparent from FIGURE 2 which depicts the balls 17 completely out of engagement with the driving member 10.

In operation the driving member 10 is designed to rotate in a direction such that the driven member engaging holes 16 at the one end 21 of each recess 20 are at the rear end of the recess in the designed direction of rotation, as depicted by the arrow in FIGURE 3.

Figure 2:
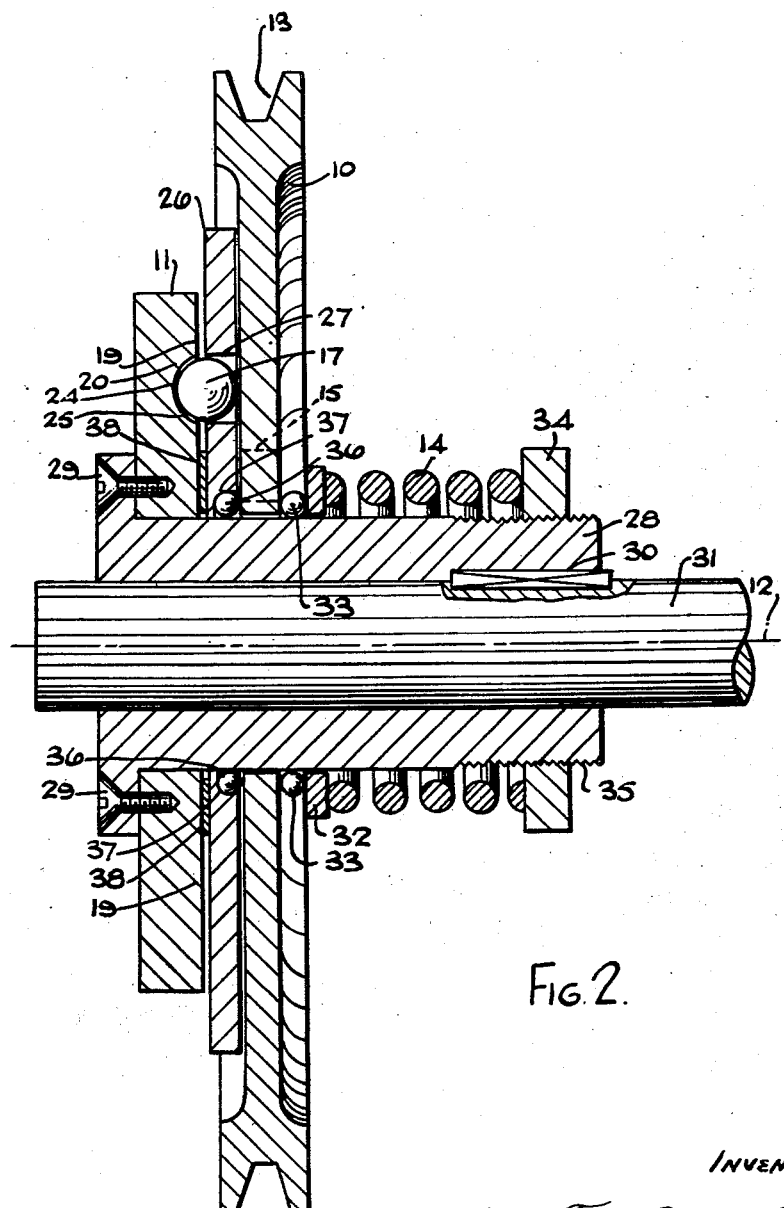
FIGURE 2 is a view similar to FIGURE 1 but showing the position of the parts when the clutch is fully disengaged and the driving member of the clutch has overrun the driven member.

When the predetermined maximum torque is exceeded, the axial pressure between the balls 17 and the edges 18 of the ball engaging holes 15, 16 is great enough to overcome the loading of spring 14 and permit of the driving member 10 rotating forwardly in relation to the driven member 11 so that the balls 17 roll out of each driven member hole 16 into the adjacent end 21 of the ball receiving recess 20 to the ball receiving portion 23 thereof in which position each ball 17 at one side thereof extends within the recess 20 by a distance such that the opposite side of the ball is now withdrawn completely from the corresponding driving member engaging hole 15, thereby completely disengaging the clutch and permitting of the driving member 10 rotating freely in relation to the driven member 11 without the balls 17 being in pressure engagement with either of these two members, as shown in FIGURE 2. Thus each ball receiving opening or recess 20 has an axial depth in a direction parallel to the clutch axis sufficiently great as when a ball is received therein to permit of the two clutch members rotating relatively without any sliding engagement between either of them and the balls.

Also as will be clearly apparent from FIGURES 1 and 2, the clutch member 11, which is provided with the ball receiving openings has its ball engaging face devoid of projections at positions between each ball positioning opening of such member and the corresponding ball receiving opening, the arrangement being such that the balls can enter and leave the ball engaging openings in such clutch member without it being necessary for the clutch members to move relatively apart against the spring or other loading by a distance substantially greater than a diameter of one of the balls.

During the aforementioned movement of the balls 17 into the ball receiving portion 22 of each ball receiving recess 20, the ball guiding cage 26 will rotate relative to the driving member 10 to the extent necessary to bring the balls into register with the ball receiving portion 22 of each recess, such rotation being effected by the fact that during the initial advancement of the balls along the recesses 20 they are still in rolling engagement with the driving member 10 and with the inclined base 24 of each recess at its ball entering end 21.

Once, however, the balls 17 are in register with the ball receiving portion 22 of each recess 20 the guiding cage 26 is no longer subjected to any force tending to rotate it in relation to the driving member and it remains with its locating holes 27 in register with the said portion 22 of each ball receiving recess so as thereby effectively to retain the balls in the desired position out of pressure engagement with the two clutch members.

Re-engagement of the clutch is effected by the operator first bringing the rotating parts to rest and then turning the cage 26 relative to the driving member 10 in a direction opposite to the designed direction of rotation of the driving member so as to advance the ball 17 back towards the end 21 of each recess, the balls riding up the inclined base 24 thereon in so doing and finally riding across the adjacent flush face of the driving and driven members 10, 11 which would be rotated relatively during this movement of the balls so that as the balls 17 are again in register with the driving member holes 15 the driven member holes 16 are simultaneously in registration therewith to effect re-engagement of the clutch under the spring loading 14.

What I claim then is:
1. An overload clutch comprising
   (a) a driving clutch member,
   (b) a driven clutch member,
   (c) means mounting said clutch members in axially spaced relationship for relative rotational movement about a common axis of rotation, one of said members being axially movable in relation to the other member,
   (d) loading means urging said axially movable member towards the other clutch member,
   (e) a ball guiding cage disposed for free rotational movement in respect of one of said clutch members between said two clutch members and having two opposite faces adjacent respective ones of said members, a plurality of ball receiving bores extending between said faces in an axial direction,
   (f) each of said members having a plurality of ball engaging openings spaced circumferentially about said axis of rotation, with the openings in one member registerable with those in the other member and with the bores in said cage, in one rotational position of the members,
   (g) a torque transmitting ball disposed in each of said cage bores, each ball having a diameter less than that of the bore but greater than the axial thickness of the cage adjacent said bore so as to be adapted to project axially beyond each of the two opposite faces of the cage into torque transmitting engagement with the ball engaging openings of the clutch members when in register with one another,
   (h) one of said clutch members having in a face thereof opposite to said other member a plurality of ball receiving grooves extending in a direction circumferential to the axis of rotation of said members, each groove having a portion of a depth such that its base is axially spaced from the adjacent face of the other clutch member by a distance greater than the diameter of the balls so as to be adapted to receive a ball disengaged from a ball engaging opening in the clutch member with the grooved face,
   (i) a ball thrust bearing between the other of said clutch members and the ball guiding cage, said bearing spacing said cage axially out of engagement with said other member,
   (j) the loading means being so biased that a predetermined torque applied by the driving member to the balls causes the balls to move the axially movable clutch member apart from the other member against the loading means by a distance sufficient to permit the balls, while still within bores in the ball guiding cage, to roll relative to the clutch members into the grooves and out of engagement with the ball engaging openings of the axially movable clutch member.

2. An overload clutch comprising
   (a) a driving clutch disc,
   (b) a driven clutch disc,
   (c) a hub connected rigidly to one of said clutch discs adjacent one end of the hub, with the other clutch disc mounted for rotation on said hub about the axis thereof,
   (d) a spring abutment on the other end of said hub,
   (e) a compression spring acting between said spring abutment and said rotatable clutch disc,
   (f) a ball guiding disc disposed for free rotational movement in respect of one of said clutch discs between said clutch discs and having two opposite faces adjacent respective ones of said clutch discs, a plurality of ball receiving bores spaced circumferentially around the axis and extending between said faces in an axial direction,
   (g) a ball thrust bearing between said ball guiding disc and said rotatable clutch disc, said bearing spacing said ball guiding disc axially from the rotatable clutch disc,
   (h) each of said clutch discs having a plurality of ball engaging openings spaced circumferentially about the axis of said hub, with the openings in one clutch disc registerable with those in the other clutch disc and with the bores in the said ball guiding disc, in one rotational position of the clutch discs,
   (i) a torque transmitting ball disposed in each of said guiding disc bores, each ball having a diameter less that that of the bore but greater than the axial thickness of the guiding disc adjacent said bore so as to be adapted to project axially beyond each of the two opposite faces of the guiding disc into torque transmitting engagement with the ball engaging openings of the clutch discs when in register with one another,
   (j) the clutch disc which is rigid with the said hub having in a face thereof adjacent said ball guiding disc a plurality of ball receiving grooves extending in a direction circumferential to the axis of said hub, each groove having a portion of a depth such that its base is axially spaced from the adjacent face of the other clutch disc by a distance greater than the diameter of the balls so as to be adapted to receive a ball disengaged from the ball engaging opening in said clutch disc with the grooved face, (k) the compression spring being so biased that a predetermined torque applied by the driving disc to the balls causes the balls to move the rotatable clutch disc apart from the rigid clutch disc against the bias of the spring by a distance sufficient to permit the balls, while still within bores in the ball guiding disc, to roll relative to the clutch discs into the grooves and out of engagement with the ball engaging openings of the rotatable clutch disc.

References Cited by the Examiner

UNITED STATES PATENTS

| | | | |
|---|---|---|---|
| 2,490,172 | 12/59 | Swahnberg | 192—56 |
| 2,969,133 | 1/61 | Langheck | 192—56 |
| 3,080,029 | 3/63 | Stoher | 192—56 |

FOREIGN PATENTS 1,113,209  11/55  France.

DAVID J. WILLIAMOWSKY, *Primary Examiner.*